United States Patent [19]

Oda et al.

[11] Patent Number: 5,134,626
[45] Date of Patent: Jul. 28, 1992

[54] SOLID LASER GENERATOR

[75] Inventors: Seiji Oda, Kawasaki; Nobuhiro Kodama, Yokohama, both of Japan

[73] Assignee: Tosoh Corporation, Shinnanyo, Japan

[21] Appl. No.: 573,119

[22] PCT Filed: Jan. 12, 1990

[86] PCT No.: PCT/JP90/00035
   § 371 Date: Sep. 13, 1990
   § 102(e) Date: Sep. 13, 1990

[87] PCT Pub. No.: WO90/08413
   PCT Pub. Date: Jul. 26, 1990

[30] Foreign Application Priority Data

Jan. 13, 1989 [JP] Japan .................. 1-4699

[51] Int. Cl.⁵ .................................. H01S 3/093
[52] U.S. Cl. .......................... 372/72; 372/41; 372/68
[58] Field of Search ............. 372/69, 70, 72, 4, 68

[56] References Cited

U.S. PATENT DOCUMENTS

| | | |
|---|---|---|
| 3,805,186 | 4/1974 | Woodcock . |
| 3,979,696 | 9/1976 | Buchman .................. 372/69 |
| 4,711,696 | 12/1987 | Kokta . |
| 4,835,786 | 5/1989 | Morris et al. ............ 372/72 |
| 4,839,902 | 6/1989 | Guch, Jr. .................. 372/70 |
| 4,858,243 | 8/1989 | Bar-Joseph ............... 372/72 |
| 4,894,837 | 1/1990 | DiFonzo et al. .......... 372/72 |
| 4,912,720 | 3/1990 | Springsteen .............. 372/72 |
| 4,989,215 | 1/1991 | Winik ....................... 372/72 |

FOREIGN PATENT DOCUMENTS

| | | |
|---|---|---|
| 61-20381 | 1/1986 | Japan . |
| 61-97982 | 5/1986 | Japan . |
| 62-212298 | 9/1987 | Japan . |
| 1205483 | 8/1989 | Japan . |

OTHER PUBLICATIONS

Optics Letters, vol. 10, No. 6 Jun. 1985, pp. 273–275; P. Lacovara et al.: "Flash-lamp-pumped Ti:A1203 laser using fluorescent conversion" p. 274, right-hand column, last paragraph—p. 275, left-hand column, paragraph 1.

*Primary Examiner*—Léon Scott, Jr.
*Attorney, Agent, or Firm*—Oblon, Spivak, McClelland, Maier & Neustadt

[57] ABSTRACT

A solid laser generator employing a flash light as light source for excitation and titanium-doped sapphire as laser medium, wherein cerium and/or erbium-doped quartz glass, transparent plastic or transparent ceramic, is disposed in the vicinity of the laser medium or in the vicinity of the flash lamp.

2 Claims, 3 Drawing Sheets

SOLID LASER GENERATOR

TECHNICAL FIELD

The present invention relates an improvement of a solid laser generator employing titanium-doped sapphire as laser medium.

BACKGROUND TECHNIQUE

A laser generator employing a solid medium is widely used for cutting machines and small-size equipments such as medical laser scalpels. Titanium-doped sapphire is used as solid medium for a laser generator. However, this material has a short fluorescence lifetime, and it does not generate a laser unless adequate excitation is conducted in a short period of time.

In the case of side excitation by means of e.g. a flash lamp as light source for excitation, it is necessary to excite almost the entire portion of the solid medium. For this purpose, it is necessary to input a large quantity of energy in a short period of time. Further, with a lamp such as a flash lamp, lights with wavelengths incapable of exciting sapphire will simultaneously be generated. Therefore, it has been a problem that the conversion efficiency of energy is low.

As a method for improving such conversion efficiency of energy, it has been common to employ a method wherein a solution tinted with a dye capable of converting light in an ultraviolet region to light in a visible region, is circulated to improve the conversion efficiency of energy. However, this method has the following problems:

1. Deterioration of the dye is unavoidable, and its replacement will be required.
2. It is necessary to always maintain the circulation system of the dye, particularly the light conversion portion, clean so that a high light transmittance be maintained.
3. It is necessary to pay an attention for the safety with respect to e.g. the toxicity of the dye. With these problems, this method can not necessarily be regarded as a suitable method.

The present inventors have conducted various studies for a laser generator free from the above problems. As a result, they have found that when titanium-doped sapphire is employed as laser medium (solid medium), efficient laser generation is possible by disposing a certain solid material in the vicinity of the laser medium and/or in the vicinity of the flash lamp. The present invention has been accomplished on the basis of this discovery.

DISCLOSURE OF THE INVENTION

Namely, the present invention relates to a solid laser generator employing titanium-doped sapphire as laser medium and a flash lamp as light source for excitation, wherein a solid material made of cerium and/or erbium-doped quartz glass, transparent plastic or transparent ceramic, is disposed in the vicinity of the laser medium and/or in the vicinity of the flash lamp.

Now, the construction of the present invention will be described in detail.

The laser medium to be used in the present invention is titanium-doped sapphire which is so-called titanium sapphire. The titanium content of this medium is usually from 0.01 to 0.2% by weight. When titanium sapphire is excited by irradiating light, light with a wavelength of about 490 nm is regarded as being most efficient. In the present invention, the above solid material to be disposed in the vicinity of the laser medium and/or the flash lamp is a material which has a property to selectively convert light in an ultraviolet region to light in a visible region i.e. light with a wavelength of about 490 nm and which is transparent to such light in the visible region. The present inventors have conducted various studies for such a material, and as a result have found that when a material prepared by incorporating cerium and/or erbium to quarts glass, transparent plastic, transparent ceramic, etc. is employed, it is possible to efficiently convert and select light capable of exciting titanium sapphire.

The proportion of such additives to the solid material is adequate within a range of up to 1% by weight, although the proportion varies depending upon the solid material. If the proportion is larger than this range, the efficiency of the solid material for converting light in the ultraviolet region to light in the visible region tends to be low, and accordingly, the conversion efficiency of energy from electric power to the laser beam tends to be low. Further, absorption of light in the ultraviolet region increases, which causes heating of the solid material and may cause a damage to the solid material. As the above described solid material, a desired material can be obtained, for example, by adding cerium and/or erbium element at the time of molding. The transparent ceramic or transparent plastic used as the solid material may be alumina, magnesia, zirconia, polycarbonate, etc.

BRIEF DESCRIPTION OF THE DRAWINGS

Each of FIGS. 1, 3 and 4 is a diagrammatical view illustrating an embodiment of the portion for exciting the laser medium of the present invention by a flash lamp.

Figure 1:
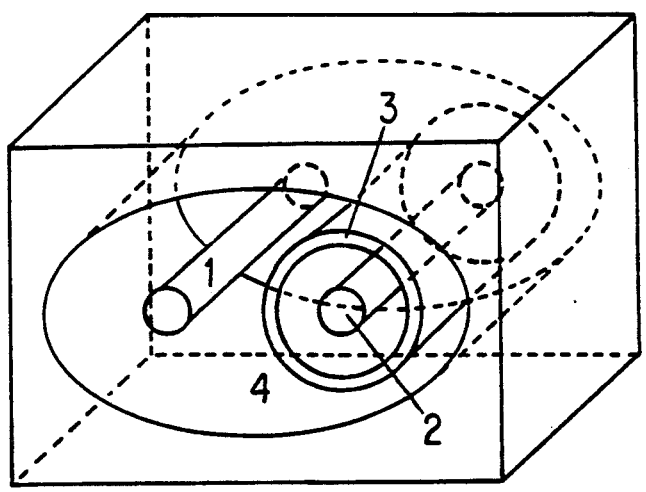

In these Figures, numeral 1 indicates a flash lamp, numeral 2 indicates a laser medium, numeral 3 indicates a solid material, numeral 4 indicates a condenser mirror, and each of numerals 5 and 6 indicates a laser mirror.

BEST MODE FOR CARRYING OUT THE INVENTION

In the apparatus of the present invention, the above-mentioned solid material is disposed in the vicinity of the laser medium and/or the flash lamp. The construction will be described with reference to the embodiments of the present invention illustrated in the drawings.

FIG. 1 is a view of the outlook of an embodiment of the apparatus of the present invention in which the solid material is disposed in the vicinity of the laser medium. In this Figure, numeral 1 indicates a flash lamp, and numeral 2 indicates a laser medium which is a cylindrical rod of titanium sapphire. Numeral 3 is a ring formed of the solid material, and numeral 4 is a light reflecting plate. The disposition of the solid material used in the present invention is not limited to the above described disposition. For example, it may be disposed around the flash lamp (FIG. 3) or around each of the flash lamp and the laser medium (FIG. 4). Namely, it may be disposed at least at a position where the light emitted from the flash lamp passes until it reaches the laser medium.

When a plastic material which is relatively weak against heat is used as the solid material, it is preferred to take a measure such as circulating a cooling medium.

Now, the present invention will be described in further detail with reference to Examples.

EXAMPLE 1

Figure 2:
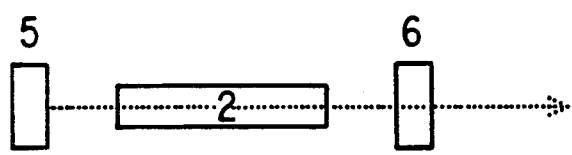
FIG. 2 is a view illustrating the construction of the generator tested in each Example and Comparative Example.

A test was conducted using a laser generator as shown in FIG. 1. As the solid material, quartz glass having cerium doped therein (numeral 2) was used. A diagrammatical view of the construction is shown in FIG. 2. As the reflecting mirrors, laser mirrors with 100% reflectance (numeral 5) and 90% reflectance (numeral 6) were used. The test was conducted by inputting an electric power of 200 J to the flash lamp (numeral 1).

The change in the intensity of the laser beam depending upon the amount of the cerium doped in the quartz glass is shown in Table 1.

TABLE 1

| Amount (wt %) | 0.1 | 0.2 | 0.5 | 0.8 | 1.0 | 1.5 | 2.0 |
|---|---|---|---|---|---|---|---|
| Laser intensity (mJ) | 22 | 24 | 35 | 40 | 38 | 34 | 30 |

EXAMPLE 2

A test was conducted with an apparatus in which two flash lamps were connected in series. As the solid material, quarts glass having cerium (0.5 wt %) doped, was used. An electric power of 200 J in total was input to the flash lamp, whereby a laser beam of 40 mJ was obtained.

EXAMPLE 3

Figure 3:
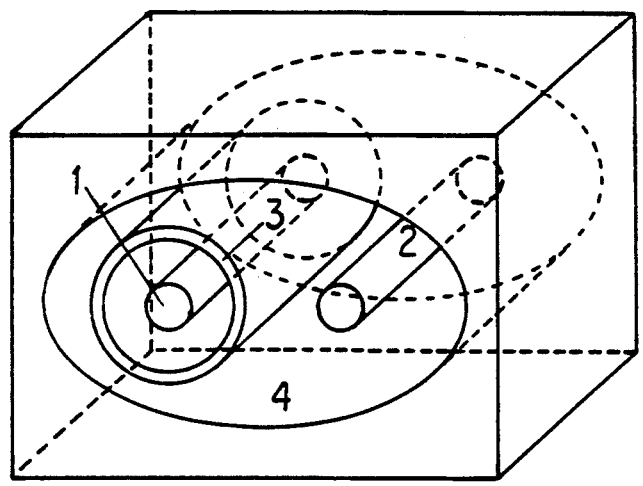
Figure 4:
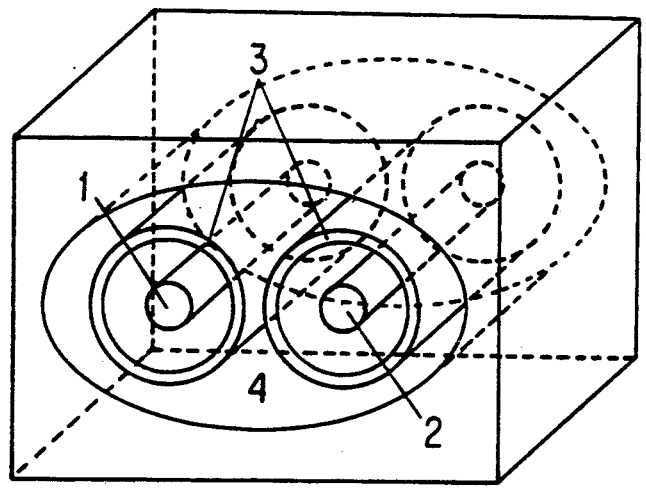

Using an apparatus in which quartz glass having cerium (0.5 wt %) doped (numeral 3) was disposed in the vicinity of a flash lamp as shown in FIG. 3, an electric power of 200 J in total was input to the flash lamp (numeral 1) with the construction as shown in FIG. 2, whereby a laser beam of 30 mJ was obtained.

COMPARATIVE EXAMPLE

Using an apparatus corresponding to the apparatus of FIG. 1, FIG. 3 or FIG. 4 in which quartz glass containing no additives was used as the solid material and an apparatus having no solid material disposed (FIG. 5), tests were conducted by inputting an electric power of 200 J in total to the flash lamp with the construction as shown in FIG. 2. The results are shown in Table 2.

TABLE 2

Figure 5:
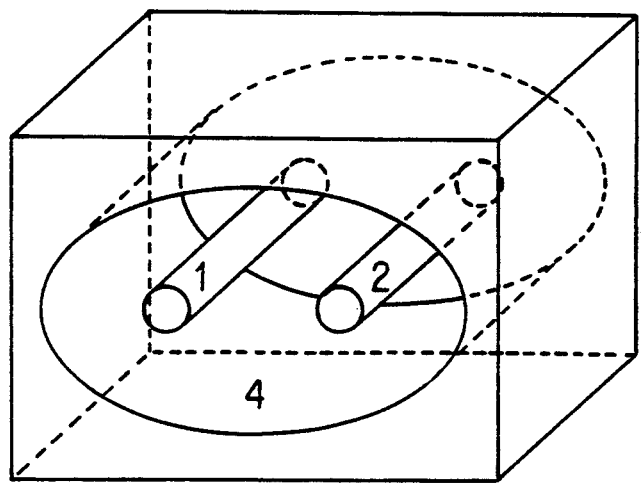
FIG. 5 is a diagrammatical view illustrating an apparatus in which no solid material is disposed.

| Construction of the apparatus | FIG. 1 | FIG. 3 | FIG. 4 | FIG. 5 |
|---|---|---|---|---|
| Laser intensity (mJ) | 20 | 22 | 23 | 18 |

INDUSTRIAL APPLICABILITY

The apparatus of the present invention in which titanium-doped sapphire is used as a laser medium, is capable of improving the conversion efficiency of energy from an electric power to a laser beam. Further, since a solid material is employed for converting the wavelength, it is unnecessary to replace the material due to deterioration thereof, and the apparatus is highly safe. Further, its maintenance is simple.

We claim:

1. In a solid laser generator employing titanium-doped sapphire as a laser medium and a flash lamp as a light source for excitation, the improvement comprises using a solid material made of cerium, erbium, or cerium and erbium doped quartz glass, transparent plastic, or transparent ceramic disposed at least at least at a position where the light emitted from the flash lamp passes before it reaches the laser medium and wherein the cerium, erbium, or cerium and erbium is doped in the solid material in an amount of from 0.1 to 2.0 wt. % to efficiently convert and select light capable of exciting titanium-doped sapphire.

2. The solid laser generator as claimed in claim 1 wherein the cerium, erbium, or cerium and erbium is doped in the solid material in an amount of from 0.1 to 1.0 wt. %.

* * * * *